Feb. 18, 1930.     N. H. BLOMGREN     1,747,568
PISTON PACKING
Filed Jan. 18, 1927    2 Sheets-Sheet 1

Inventor:
Nils H. Blomgren,
By H. L. Woodward
Attorney

Feb. 18, 1930.  N. H. BLOMGREN  1,747,568
PISTON PACKING
Filed Jan. 18, 1927  2 Sheets-Sheet 2
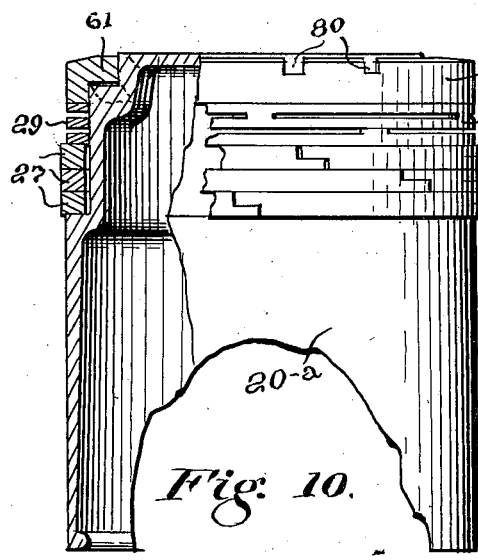
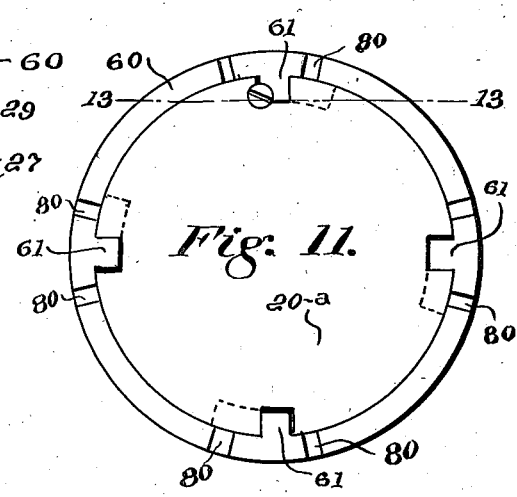
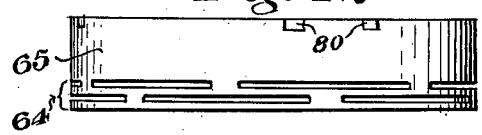
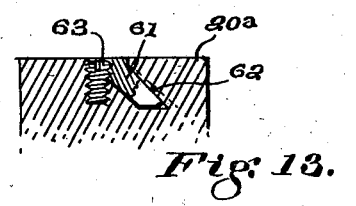
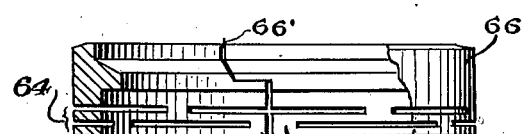
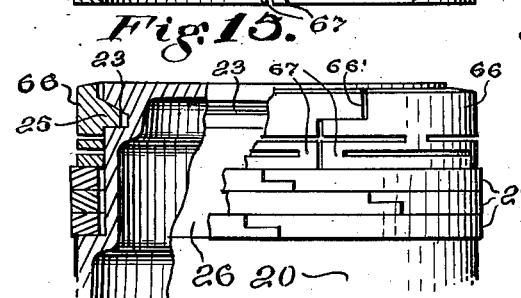
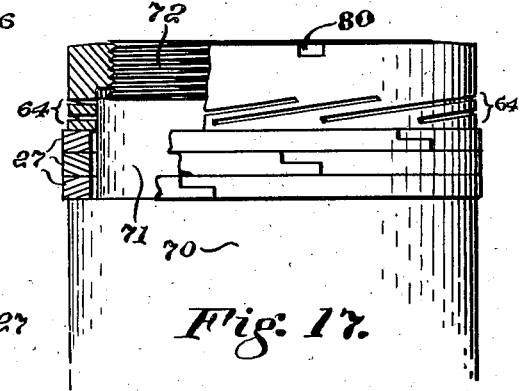
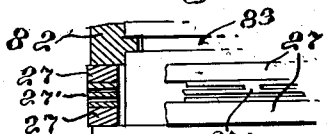
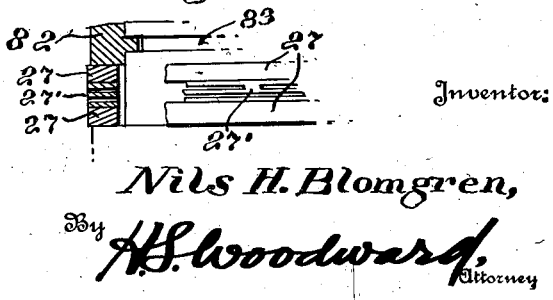
Inventor:
Nils H. Blomgren,
By H.S. Woodward,
Attorney Patented Feb. 18, 1930

1,747,568

UNITED STATES PATENT OFFICE

NILS H. BLOMGREN, OF BROOKLYN, NEW YORK

PISTON PACKING

Application filed January 18, 1927. Serial No. 161,837.

The invention has for an object to effect improvements in piston packings particularly with the object of securing side contact between mutually adjacent rings or between rings and piston groove sides in an improved way. It is also a special object to present a novel construction in the piston adapting it to ready use with packing devices of the character indicated.

Packing rings have been made consisting of a split ring having slots therethrough from the periphery to the inner face arranged in a circumferential series with mutually adjacent end portions overlapped to make the ring axially compressible. The formation of joints in such rings has been a problem, and they have been excessively liable to breakage especially at the joints, and in addition have been faulty in maintaining uniform side pressure when compressed within a groove. It is therefore a purpose of this invention to enable the attainment of the ends sought in such rings without employing such construction in the packing rings, to obviate the defects attendant on joints in such devices; to secure a uniformity of stress on the side of the rings, as well as to remove entirely the liability of breakage due to the formation of joints in axially compressible rings of the kind indicated, and minimize liability of breakage generally. It is also an aim to enable the practical attainment of improved results in such devices in other respects.

Additional objects, advantages and features of invention reside in the construction, arrangement and combination of parts as will be understood from the following description and accompanying drawings of the invention as practiced, wherein Figure 1 is an elevation partly in section of a piston and packing constructed in accordance with my invention.

Figure 5 is a fragmentary vertical section of a piston and retainer ring of modified form intended for use with the elastic land ring of Figure 2, or the like.

Figure 6 is a view similar to Figure 1 showing a further modification of the retainer ring.

Figure 10 is an elevation partly in section of a piston and another modified retainer ring.

Figure 11 is a top view of the structure of Figure 10.

Figure 12 is an elevation of a modification of the retainer ring of Figure 10.

Figure 13 is a fragmentary vertical section showing the form of the interlocking parts on the line 13—13 of Figure 11.

Figure 14 is a fragmentary top view of the retainer ring of Figures 10 and 11.

Figure 15 is an elevation partly in section of a still further modification of combined retainer and elastic side compression ring.

Figure 16 is a view of the last mentioned ring assembled on a piston in operative relation to packing rings.

Figure 17 illustrates another form of combined retainer and side pressure device to confine piston rings on the piston.

Fig. 18 is a fragmentary elevation partly in section of a piston and packing including a modified retainer ring rib and groove.

Figure 1:
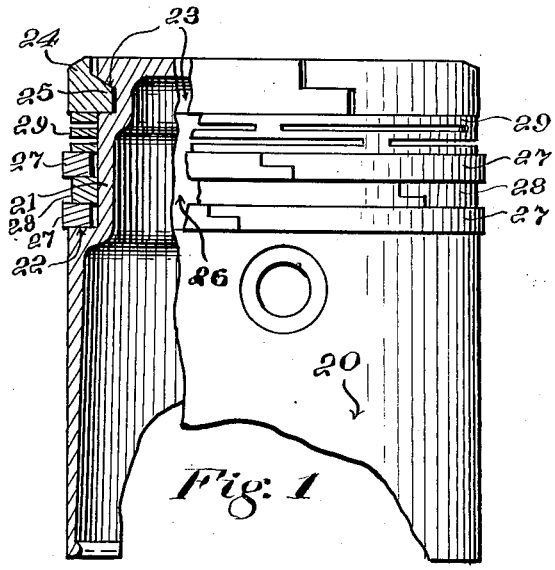
Figure 2:
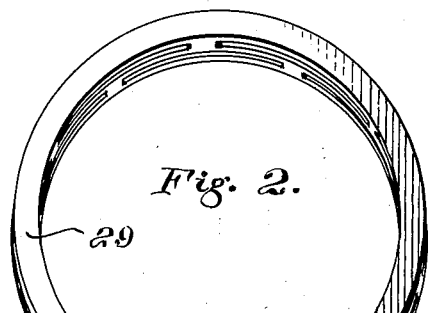
Figure 2 is a perspective of the axially elastic ring.
Figure 3:
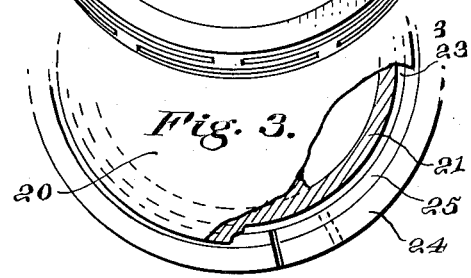
Figure 3 is a top view of the piston with parts broken away.

There is illustrated a piston 20 in Figure 1, the skirt and wrist mounting in which may conform to approved practices. The upper part, however, is reduced in diameter to the extent of the depth of the usual packing ring groove in the ordinary piston of an internal combustion engine. This forms a cylindrical wall 21 around which may be laid piston rings or alternated rings and lands, as will be explained, a shoulder 22 in a plane at right angles to the axis of the piston being formed at its junction with the skirt of the piston. Near and parallel to the top of the piston, a groove 23 is formed in the outer face of the wall 21, the upper side of this groove being inclined upwardly and outwardly. A split retainer ring 24 is provided having a rib 25 on its inner side conforming to the shape of the groove 23 and adapted to wedge into the groove by contraction of the ring. The ring 24 is contractible diametrically and elastic so that it may be opened to slip over the end of the piston and will then contract when the rib 25 comes over the groove and snap into snug fit with the piston. The lower side of the groove and ring are planiform and at right angles to the axis of the piston.

With the ring 24 put in place as indicated, it will be seen that a broad circumscribing groove or channel 26 having a cylindrical bottom is formed on the piston. Inwardly of the ring 24 around the wall 21 there are disposed a number of packing rings 27 and lands 28 alternated, each being like the plain solid rings generally familiar in the art and having a break at one side, whereby the rings may expand against the cylinder wall, and the lands may contract against the piston. In addition, there is introduced one side expansion land ring 29 without a break but formed with a circumferential series of slots extending from the periphery of the ring to its inner face and having their end portions overlapped so that the intervening material serves as an elastic element permitting compression of the sides of the ring and its expansion back to its original form. These rings may all be formed either of cast iron, or of suitable spring steel. If, desired, three simple packing rings 27 may be introduced into the groove with the ring 29, as in Figure 6, or additional rings 29 alternated with the rings 27, as in Figure 5.

The parts are so proportioned that the aggregate of the widths of all the rings is slightly more than the distance between the shoulder 22 and the ring 24, therefore requiring a compression of the ring 29 in order to admit all to the groove 26. These rings, or the rings and lands are thereby all held in snug contact at their abutting sides, and a high sealing value attained, especially in conjunction with the oil film supplied by the lubricating systems of engines in which the invention is used.

Figures 5, 6:
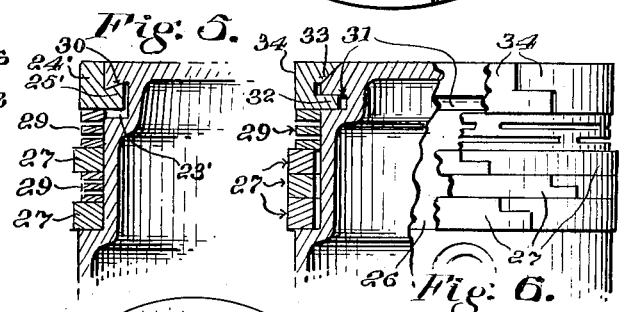

In Figure 5 the piston is similar to the one in Figure 1, except that the upper side of the groove 23' corresponding to the groove 23 is undercut as at 30, and the rib 25' of the retainer ring 24' is similarly cut, to match the surface of the groove, the under cut surfaces sloping so that as the ring 24' is pressed toward the head of the piston by the packing elements which it confines it is held more securely against casual expansion and also the outer part of the retainer ring drawn snugly against the piston thereby in addition to the contractile action of the ring 24' itself. By this means, in case a fracture of the ring 24' should occur, the pieces will be held in place and will still function to retain the packing properly.

In Figure 6 the piston is bevelled at the top, a groove 31 being formed in the periphery of the piston therebelow to receive a flange 32 on the ring 34, which is grooved to form this flange, the upper side of the groove being inclined to snugly fit the bevelled surface 33. By the contraction of the ring 34 against the piston the flange 32 is drawn snugly against the upper side of the groove 31 and any loose movement of the ring 34 longitudinally of the piston prevented at any time.

Figure 4:
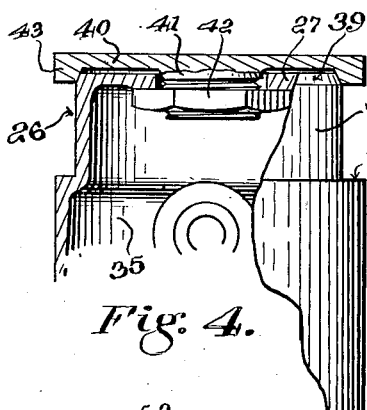
Figure 4 is a view similar to Figure 1 of a modification, the packing rings being omitted.

In Figure 4 the piston body 35 is simplified and consists of the simple lower skirt portion and a reduced upper cylindrical wall 35 and centrally apertured head 37. A shoulder 38 is formed at the junction of the skirt and wall 36, and the piston is bevelled at the top as at 39. A removable crown 40 is provided, of a diameter nearly or quite equal to that of the skirt of the piston. This crown is formed with a threaded stud 41 projected through the aperture in the head of the piston and receiving a nut 42 within the piston by which the crown is clamped in place. The outer edge of the crown is formed with a flange 43 fitting snugly the bevel of the top of the piston, its lower edge being planiform and opposed to the shoulder 38 to form the groove 26 to receive the packing devices previously described, as in Figures 1, 5 and 6.

Figure 7:
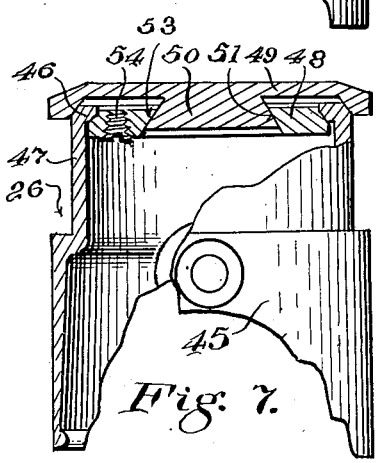
Figure 7 is a similar view of a modification of the retainer means.
Figures 8, 9:
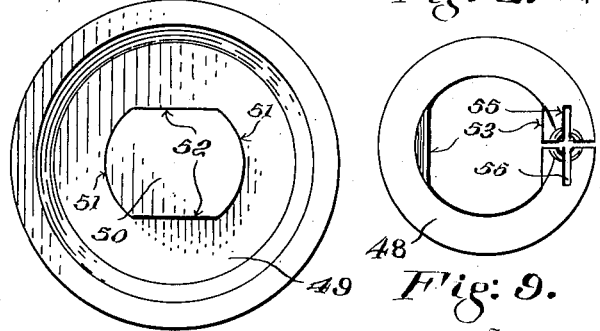
Figure 8 is a bottom view of the piston crown of Figure 7.
Figure 9 is a similar view of the locking ring of Figure 7.

In Figures 7 to 9 inclusive, the piston 45 is similar to the one in Figure 4 except that the opening through the head of the body is enlarged so that only a small flange or shoulder 46 is formed within the reduced cylindrical wall 47 forming the upper body of the piston. This flange is bevelled on the lower edge to engage snugly the correspondingly bevelled upper peripheral part of a split clamp ring 48 introduced from below. A crown 49 is provided on this piston fitting the exterior bevel at the top of the piston as in the device of Figure 4. The crown has formed centrally thereon a lug 50 having concentric semi-circular dove-tail parts 51 at opposite sides and with two flattened sides 52 parallel and spaced the same as the minimum between the circular dove-tail parts of the lug. The ring 48 is formed with a substantially circular opening to receive the larger part of the lug 50 therethrough, and at opposite sides is formed with parallel bevels 53 adapted to receive the sides 52 therebetween without engagement, and to engage snugly under the dovetail parts 51 when the ring 48 and crown are rotated relatively thereafter. The split of the ring 48 is at right angles to and intermediately of one of the bevels 53, and a tapered screw 54 is engaged between the ends thus formed, suitable threads being formed on the opposed ends of the ring to receive the screw, as shown. The crown being positioned over the piston and the ring 48 within the piston so that the lug 50 enters through the ring 48, the crown and ring are turned a quarter revolution relatively to each other so that they are initially secured, then, by screwing the screw 54 the ring is expanded against the piston, and the ends at the split spread to wedge the lug 50 between the bevels 53. If desired, slots 55 may be formed extending from the split into each end of the ring, to facilitate the spreading thereof.

In Figures 10, 11, 13 and 14, a structure is shown in which the retainer ring does not require to be split, but may be a rigid unbroken annulus 60. It is formed with a suitable number of lugs 61 at the inner side to engage corresponding inclined slots 62 opening on the top and side faces of the piston, the lugs being adapted to bear against the upper sides of the grooves under rotation of the ring 60 on the piston, to hold the ring 60 at the lowermost position on the piston. To secure this function, a hole is drilled and threaded partly in the ring and partly in the piston to receive a screw, as at 63, in Figures 11 and 13. By having this hole at the back side of a lug, the wedging action of the screw may be utilized to move the ring into a tight fit with the piston at the lugs. This construction is used with a ring 26 and packing rings and lands as before described.

If desired, the axially elastic ring may be formed integrally with the ring 60, as shown in Figure 12, where the upper part of the retainer ring 65 may be formed like the ring 60, with an extended annular lower part 64 to lie around the upper reduced part of the piston and having slots formed therein to give this lower part axial elasticity. This lower part may then—like the ring 26—bear yieldingly on the packing rings which may be introduced into the groove 26 which it forms in conjunction with the shoulder at the lower limit of the reduced part of the piston. The combined retainer and axially elastic ring may be formed in any of the modifications described, and in Figures 15 and 16 it is shown embodied in the split retainer ring of Figure 1. Here the ring 65 is formed with the rib 25 to cooperate with the groove 23 of the piston 20 as before explained, while its lower part is horizontally slotted like the part 64 last mentioned, except that two of the lowermost mutually adjacent alined horizontal slots stop short of each other a little more than do the other alined slots, so that the break or split 66 may extend between these two leaving ample metal on the two ends 67 thus formed to give strength to them to lessen liability of breakage and to enable them to transmit pressure efficiently.

If desired, the combined retainer and axially compressible ring may be formed to screw on to the head of the piston, as shown in Figure 17. In this instance, the piston 70 is a simple casting having an upper reduced wall 71, and above this a further reduced threaded part 72, while the retainer ring is correspondingly formed to screw on to the piston and lie with its lower axially elastic portion around the wall 71 to yieldingly confine rings or rings and lands, as before indicated. In this form also it is indicated how a single series of slots inclined to the plane of the ring and in overlapping relation may be used instead of the horizontal slots, in any of the axially elastic elements.

It is an important advantage of my invention that, by the use of the constructions of Figures 4, 7 and 10, it is readily practicable to remove the packing rings from pistons of internal combustion engines having removable cylinder heads without removing the pistons from the cylinder. To do this, the piston is adjusted at the upper and outer limit of its stroke, the retainer pieces removed, and the piston then moved toward the inner limit of its stroke. This will leave the rings supported by friction against the wall of the cylinder, and well above the piston, where the hand may be inserted to withdraw them. This is of great value where simple inspection only is necessary; but it also permits replacement similarly with standard renewal parts, owing to the fact that extreme nicety of size is not required in the measurements of the parts longitudinally of the piston. And it is possible to fit the rings properly for circumferential fit in the cylinder from the top of the cylinder while the piston is in the lower part. Replacement of the packing assembly may be accomplished by introducing the rings and other elements in proper order into the upper end of the cylinder and forcing them downwardly around the reduced upper end of the piston. The retainer is then replaced by the obvious steps required. The oil pan of the motor would ordinarily require to be removed for the application of the fastenings of Figures 4 and 7, but the device of Figure 10 will permit all work on the packing to be done through the top of the cylinder block. By forming suitable slots or notches 80 in the upper face of the retainer of Figure 17 this ring also may be removed from the piston while in the cylinder, by means of a spanner wrench or other tool for rotating the ring.

It may not be essential to form the rib 25 and like elements of the split retainer rings with inclined parts, and in Fig. 18 a simple rib 82 is shown on the retainer ring, adapted to fit a plain groove 83. This view also indicates the use of an axially compressible packing ring 27' in place of the land ring 29, between two plain rings 27, as may be understood.

I claim:

1. As an improved article of manufacture a combined retainer and ring fitter comprising a ring shaped to engage upon a piston, and having an integral inner part axially elastic for confinement of packing rings inwardly thereof when engaged on a piston.

2. A piston having a reduced upper part forming a shoulder, a retainer on said upper part consisting of a split ring adapted to contract on the piston, said reduced part being peripherally recessed to receive parts of the retainer, and a plurality of packing devices on the reduced part between said shoulder and retainer, the structure recited including an annular element elastic, compressible and expansible axially of the piston.

3. The structure of claim 2 in which said retainer is a combined retainer and packing ring fitter, of substantial contracting strength diametrically, having an integral axially elastic part and being shaped at its inner part to confine packing rings against said shoulder by the inherent resilience of the retainer.

In testimony whereof I affix my signature.

NILS H. BLOMGREN.